(12) United States Patent
Kim (10) Patent No.: US 7,619,800 B2
(45) Date of Patent: Nov. 17, 2009

(54) LASER SCANNING UNIT AND IMAGE FORMING APPARATUS

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 11/867,075

(22) Filed: Oct. 4, 2007

(65) Prior Publication Data

US 2008/0285105 A1 Nov. 20, 2008

(30) Foreign Application Priority Data

May 16, 2007 (KR) .................. 10-2007-0047844

(51) Int. Cl.
*G02B 26/08* (2006.01)

(52) U.S. Cl. .................................. 359/204.1

(58) Field of Classification Search ......... 359/204–208, 359/216–218; 347/241–244
See application file for complete search history.

(56) References Cited

U.S. PATENT DOCUMENTS 7,277,212 B2 * 10/2007 Miyatake et al. ............ 359/205
2006/0203264 A1 * 9/2006 Miyatake .................... 358/1.7

* cited by examiner

*Primary Examiner*—Euncha P Cherry
(74) *Attorney, Agent, or Firm*—Stein McEwen, LLP (57) ABSTRACT

A laser scanning unit and an image forming apparatus that include a deflector to deflect incident light; and a plurality of sub-scanning optical systems using the same reflective surface of the deflector. Each of the sub-scanning optical systems includes a light source, an entrance optical unit disposed between the light source and the deflector to direct light to the deflector, and an exit optical unit to direct the deflected light to imaging surfaces. Optical paths of the sub-scanning optical systems are asymmetric with reference to the deflector.

24 Claims, 7 Drawing Sheets

LASER SCANNING UNIT AND IMAGE FORMING APPARATUS

CROSS-REFERENCE TO RELATED PATENT APPLICATION

This application claims the benefit of Korean Patent Application No. 2007-47844, filed May 16, 2007, in the Korean Intellectual Property Office, the disclosure of which is incorporated herein in its entirety by reference.

BACKGROUND OF THE INVENTION

1. Field of the Invention

Aspects of the present invention relate to a laser scanning unit and an image forming apparatus, and more particularly, to a laser scanning unit including a sub-scanning optical system having an asymmetric optical path with reference to a light deflector, and an image forming apparatus employing the same.

2. Description of the Related Art

In laser printers, laser scanning units scan a photoconductive drum using a light beam to form an electrostatic latent image. Black and white laser printers transfer only a black toner onto a print medium, and thus use one laser scanning unit and one organic photo-conductor (OPC) drum. In contrast, color laser printers transfer black, magenta, yellow, and cyan toners onto a print medium, and thus respectively require four sub-scanning optical systems and four OPC drums (i.e., a laser scanning unit for each of the colors to be applied). However, laser scanning units account for a large percentage of the fabrication cost of a color laser printer and greatly affect print quality. Therefore, in order to decrease the fabrication cost of a color laser printer, the number of components of the laser scanning unit needs to be reduced, and the scanning characteristics of the sub-scanning optical systems need to be improved.

SUMMARY OF THE INVENTION

Aspects of the present invention provide an asymmetric laser scanning unit with a reduced number of components in sub-scanning optical systems of which the linearity is improved, and an image forming apparatus employing the same.

According to an aspect of the present invention, there is provided a laser scanning unit including: a deflector to deflect incident light; and a plurality of sub-scanning optical systems to form electrostatic latent images on corresponding imaging surfaces using the deflector, wherein each of the sub-scanning optical systems includes: a light source; an entrance optical unit disposed between the light source and the deflector to direct light to the deflector; and an exit optical unit to direct the deflected light to the corresponding imaging surfaces, wherein optical paths of the sub-scanning optical systems are asymmetric.

According to aspects of the present invention, the imaging surfaces may be disposed on different planes depending on the sub-scanning optical systems, and the lengths of the optical paths of the exit optical unit or from the deflector to the corresponding imaging surfaces may be different from each other in the sub-scanning optical systems.

According to aspects of the present invention, a variation of a linearity of scanning lines formed on the imaging surfaces by the sub-scanning optical systems may be ±0.1% or less; a positional deviation of scanning lines formed on the imaging surfaces by the sub-scanning optical systems may be ±0.5 dots or less; and a ratio of effective scanning angles of the sub-scanning optical systems may range from 0.7 to 1.3.

According to aspects of the present invention, the exit optical unit of each sub-scanning optical system may include an f-θ lens and may include one or more reflective mirrors. Further, the entrance optical unit may include a collimating lens and a cylindrical lens.

According to another aspect of the present invention, there is provided a laser scanning unit including: a first deflector to deflect incident light; first and second sub-scanning optical systems to form electrostatic latent images on corresponding imaging surfaces using the first deflector; a second deflector to deflect incident light; and third and fourth sub-scanning optical systems to form electrostatic latent images on corresponding imaging surfaces using the second deflector, wherein the first through fourth sub-scanning optical systems each includes: a light source; an entrance optical unit disposed between the light source and the deflector to direct light to the deflector; and an exit optical unit to direct the deflected light to the corresponding imaging surfaces, wherein optical paths of the first and second sub-scanning optical systems from the first deflector to the corresponding imaging surfaces are asymmetric with reference to the first deflector, and optical paths of the third and fourth sub-scanning optical systems from the second deflector to the corresponding imaging surfaces are asymmetric with reference to the second deflector.

According to another aspect of the present invention, there is provided an image forming apparatus including: a laser scanning unit; imaging surfaces on which electrostatic latent images are formed by a light beam scanned by the laser scanning unit; a developing unit to develop the electrostatic latent images; and a transfer unit to which the developed images are transferred, wherein the laser scanning unit includes: a deflector to deflect incident light; and a plurality of sub-scanning optical systems to respectively form the electrostatic latent images on the imaging surfaces using the deflector, wherein the sub-scanning optical systems each includes: a light source; an entrance optical unit disposed between the light source and the deflector to direct light to the deflector; and an exit optical unit to direct the deflected light to the imaging surfaces, wherein optical paths of the sub-scanning optical systems from the deflector to the imaging surfaces are asymmetric.

According to another aspect of the present invention, there is provided an image forming apparatus including: a laser scanning unit; imaging surfaces on which an electrostatic latent image is formed by a light beam scanned by the laser scanning unit; a developing unit to develop the electrostatic latent images; and a transfer unit to which the developed images are transferred, wherein the laser scanning unit includes: a first deflector deflecting incident light; first and second sub-scanning optical systems to form electrostatic latent images on corresponding imaging surfaces using the first deflector; a second deflector deflecting incident light; and third and fourth sub-scanning optical systems to form electrostatic latent images on corresponding imaging surfaces using the second deflector, wherein the first through fourth sub-scanning optical systems each includes: a light source; an entrance optical unit disposed between the light source and the deflector to direct light to the deflector; and an exit optical unit to direct the deflected light to the corresponding imaging surfaces, wherein optical paths of the first and second sub-scanning optical systems from the first deflector to the imaging surfaces are asymmetric, and optical paths of the third and fourth sub-scanning optical systems from the second deflector to the imaging surfaces are asymmetric.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
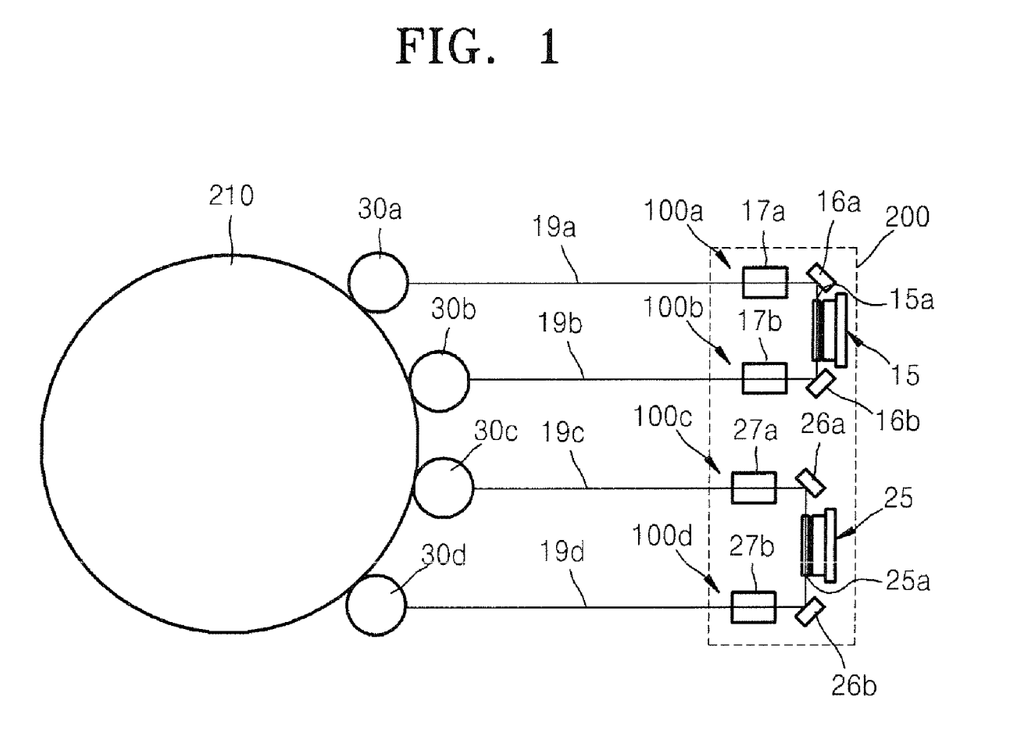
FIG. 1 is a view of a laser scanning unit according to aspects of the present invention.
Figure 2:
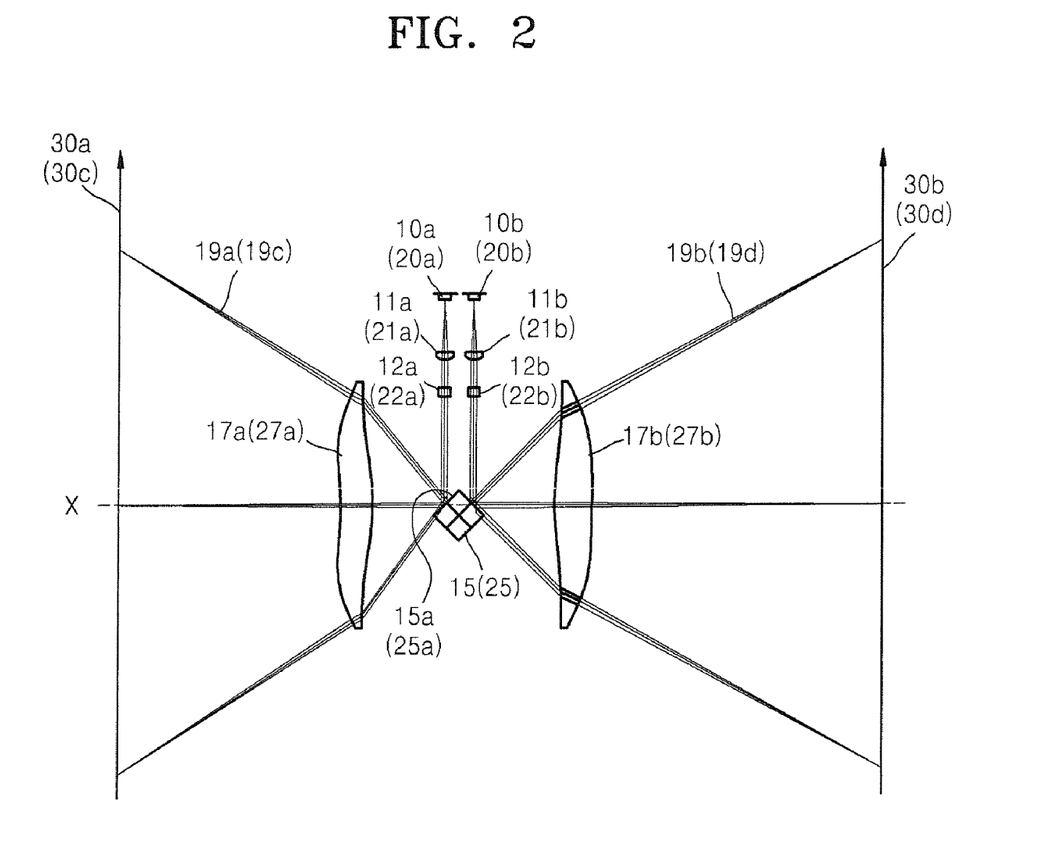
FIG. 2 is a plan view of a laser scanning unit according to aspects of the present invention.

FIG. 1 is a view of a laser scanning unit 200 according to aspects of the present invention, and FIG. 2 is a plan view of the laser scanning unit 200 according to aspects of the present invention. Referring to FIG. 1, the laser scanning unit 200 includes first and second deflectors 15 and 25 that deflect incident light and first through fourth sub-scanning optical systems 100a, 100b, 100c, and 100d that scan first through fourth imaging surfaces 30a, 30b, 30c, and 30d using light beams. The first through fourth sub-scanning optical systems 100a, 100b, 100c, and 100d commonly use reflective surfaces 15a and 25a with reference to the first and second deflectors 15 and 25. The first through fourth sub-scanning optical systems 100a, 100b, 100c, and 100d commonly use the first and second deflectors 15 and 25 and have asymmetric optical paths 19a, 19b, 19c and 19d with reference to the first and second deflectors 15 and 25.

In FIG. 1, the first and second sub-scanning optical systems 100a and 100b commonly use the first deflector 15, and the third and fourth sub-scanning optical systems 100c and 100d commonly use the second deflector 25.

In FIG. 1, mirrors 16a, 16b, 26a, and 26b are disposed between the first and second deflectors 15 and 25 and the first through fourth f-θ lenses 17a, 17b, 27a, and 27b to redirect the optical path of the light reflected from the first and second deflectors 15 and 25. The arrangement and the number of reflective mirrors may vary depending on the size or performance of the first through fourth sub-scanning optical systems. The first through fourth imaging surfaces 30a, 30b, 30c, and 30d may be disposed on the same plane or different planes and may be respectively configured with first through fourth photoconductive drums. According to aspects of the present invention, the first through fourth imaging surfaces 30a, 30b, 30c, and 30d are disposed on a transfer unit 210 that may be configured with a transfer belt or a transfer drum. For example, first through fourth photoconductive drums may be disposed on a transfer belt so as to be located on the same plane, or, as illustrated in FIG. 1, disposed on a transfer drum so as to be located on different planes (i.e., the imaging surfaces 30a, 30b, 30c, and 30d are disposed about a circumference of the transfer drum (shown as transfer unit 210) and are arranged in a semi-circular configuration). The first through fourth imaging surfaces 30a, 30b, 30c, and 30d may be configured to form magenta (M), yellow (Y), cyan (C), and black (K) images, respectively.

The first through fourth sub-scanning optical systems 100a, 100b, 100c, and 100d according to aspects of the present invention respectively include asymmetric optical paths with reference to the first and second deflectors 15 and 25 as shown in FIG. 1. Asymmetric optical systems have at least one different physical length of physical lengths from the first and second deflectors 15 and 25 to the first through fourth imaging surfaces 30a, 30b, 30c and 30d or at least one different focal length of focal lengths of the first through fourth f-θ lenses 17a, 17b, 27a and 27b. FIG. 2 illustrates that the first and second sub-scanning optical systems 100a and 100b that commonly use the first deflector 15. As the third and fourth sub-scanning optical systems 100c and 100d that commonly use the second deflector 25 respectively have the same structure as the first and second sub-scanning optical systems 100a and 100b, a description of the third and fourth sub-scanning optical systems 100c and 100d will not be given. The first and second sub-scanning optical systems 100a and 100b commonly use the same reflective surface 15a of the first deflector 15 and respectively have different optical paths formed from the first deflector 15 to the first and second imaging surfaces 30a and 30b. When the optical paths of the first and second sub-scanning optical systems 100a and 100b are asymmetric with reference to the first deflector 15, the optical paths of the first and second sub-scanning optical systems 100a and 100b should have similar characteristics, such as the linearity of scanning lines or deviation in imaging portions, so as to improve print quality.

Referring to FIG. 2, the first sub-scanning optical system 100a includes a first light source 10a, a first entrance optical unit that directs light from the first light source 10a to the first deflector 15, and a first exit optical unit that directs the light reflected from the first deflector 15 to the first imaging surface 30a. The second sub-scanning optical system 100b includes a second light source 10b, a second entrance optical unit that directs light from the second light source 10b to the first deflector 15, and a second exit optical unit that directs the light reflected from the first deflector 15 to the second imaging surface 30b. The third sub-scanning optical system 100c includes a third light source 20a, a third entrance optical unit that directs light from the third light source 20a to the second deflector 25, and a third exit optical unit that directs the light reflected from the second deflector 25 to the third imaging surface 30c. The fourth sub-scanning optical system 100d includes a fourth light source 20b, a fourth entrance optical unit that directs light from the fourth light source 20b to the second deflector 25, and a fourth exit optical unit that directs the light reflected from the second deflector 25 to the fourth imaging surface 30d.

The first through fourth light sources 10a, 10b, 20a, and 20b may include laser diodes that emit light having different and/or differing wavelengths. The first and second deflectors 15 and 25 may include a rotatable polygon mirror that is rotated by a motor.

The first through fourth entrance optical units are disposed between the corresponding first through fourth light sources 10a, 10b, 20a, and 20b and the first and second deflectors 15 and 25, and respectively include first through fourth collimating lenses 11a, 11b, 21a, and 21b and first through fourth cylindrical lenses 12a, 12b, 22a, and 22b. The collimating lenses 11a, 11b, 21a, and 21b collimate light emitted from the light sources 10a, 10b, 20a and 20b, and the cylindrical lenses 12a, 12b, 22a, and 22b focus the collimated light on the first and second deflectors 15 and 25. The first through fourth exit optical units are disposed between the corresponding first and second deflectors 15 and 25 and the first through fourth imaging surfaces 30a, 30b, 30c, and 30d, and respectively include first through fourth f-θ lenses 17a, 17b, 27a, and 27b that focus light reflected from the first and second deflectors 15 and 25 on the first through fourth imaging surfaces 30a, 30b, 30c, and 30d. Each of the first through fourth f-θ lenses 17a, 17b, 27a, and 27b may be formed in one piece or using a plurality of lens sheets and may have different focal lengths depending upon a physical distance between the first through fourth f-θ lenses 17a, 17b, 27a, and 27b and the first through fourth imaging surfaces 30a, 30b, 30c, and 30d.

In FIG. 2, the asymmetric optical paths 19a, 19b, 19c, and 19d are straight and not bent; however, one or more reflective mirrors may be provided in each of the first through fourth entrance optical units and/or the first through fourth exit optical units to redirect the asymmetric optical paths 19a, 19b, 19c, and 19d.

Figure 3:
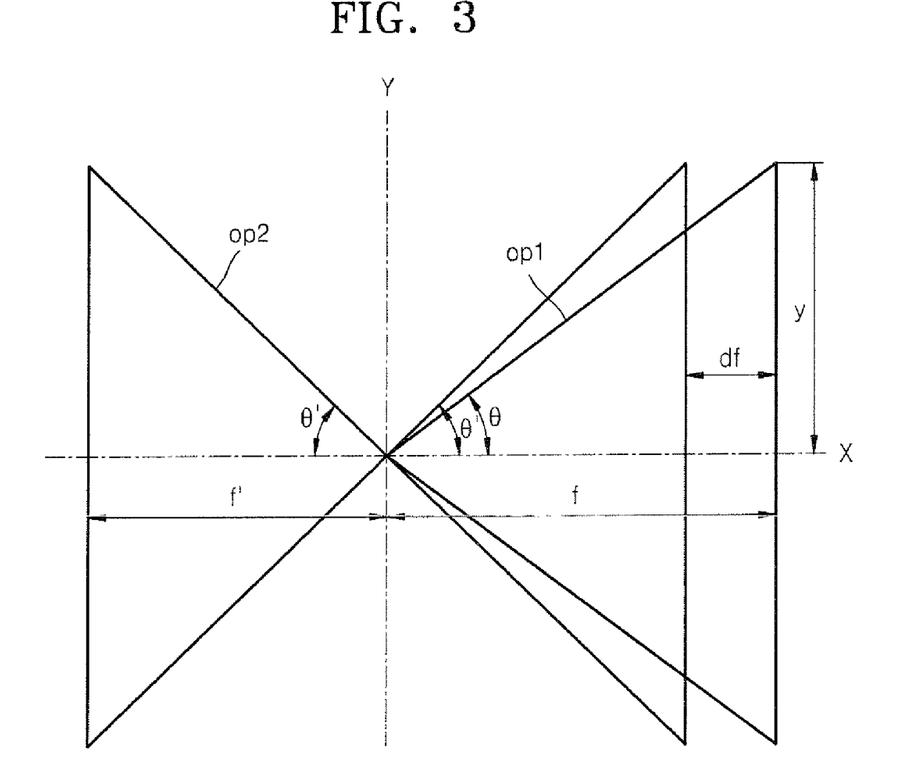
FIG. 3 is a graphical view of asymmetric optical paths of a laser scanning unit in an X-Y coordinate system according to aspects of the present invention.

FIG. 3 schematically illustrates asymmetric optical paths in an X-Y coordinate system using a deflector as an origin, according to aspects of the present invention. Here, a Y-value (hereinafter, referred to as an image width y) of an imaging portion may be represented by Equation 1 using an effective scanning angle θ and a focal length f of an f-θ lens $$y \approx f \times \theta \qquad \text{[Equation 1]}$$

According aspects of the present invention, an image width of a first optical path op1 may be represented by $y_1 \approx f \times \theta$, and an image width of a second optical path op2 (equal to that of the first optical path op1) may be represented by $y_2 \approx f' \times \theta'$. The widths $y_1$ and $y_2$ of the first and second optical paths op1 and op2 should be formed having a same image width, such that image width $y_1$ equals image width $y_2$, even if the first and second optical paths op1 and op2 are asymmetric, and thus, the image widths of the first and second optical paths op1 and op2 may be represented by Equation 2.

$$y \approx f\theta = f'\theta' = (f - df)\theta' \qquad \text{[Equation 2]}$$

Figure 4A:
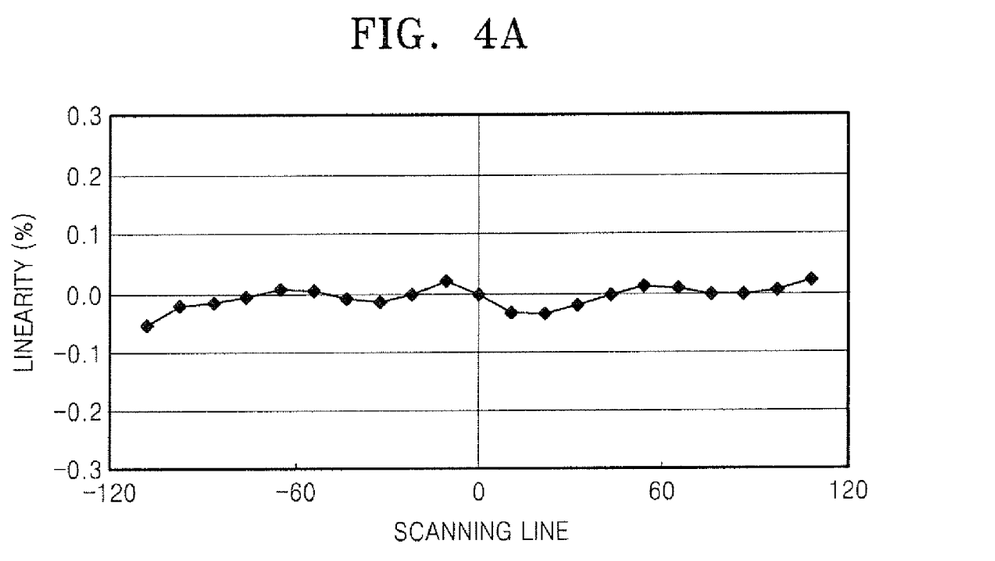
FIG. 4A is a graph illustrating the linearity of a scanning line along a first optical path of a laser scanning unit according to aspects of the present invention.
Figure 4B:
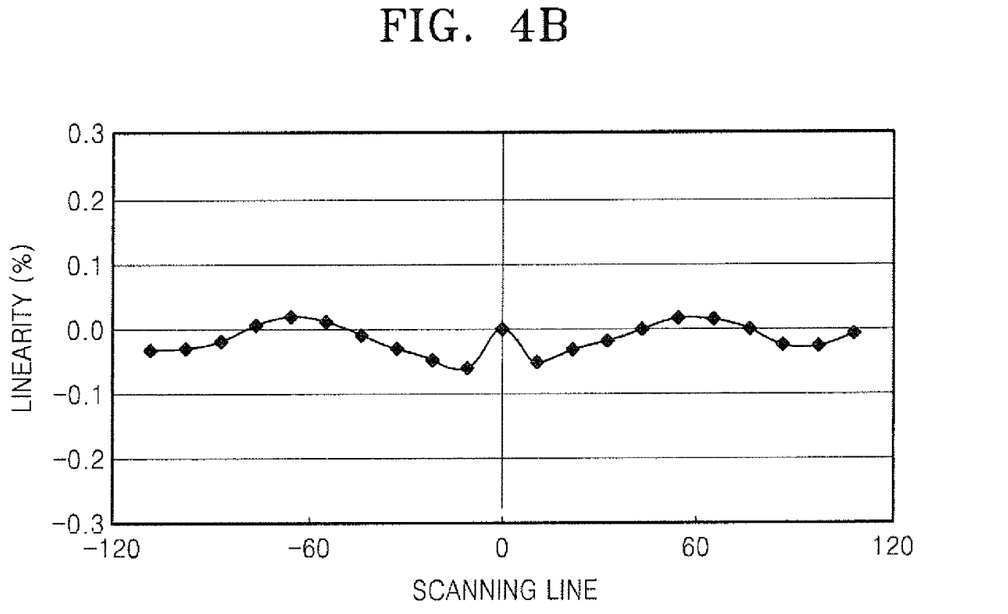
FIG. 4B is a graph illustrating the linearity of a scanning line along a second optical path of a laser scanning unit according to aspects of the present invention.

FIGS. 4A and 4B illustrate the linearity of scanning lines along the first and second optical paths op1 and op2. The linearity may be represented by Equation 3.

$$\text{linearity (\%)} = \frac{(y - f\theta)}{f\theta} \times 100 \qquad \text{[Equation 3]}$$

Here, y represents an ideal imaging portion, and fθ represents a substantial imaging portion or the image width. The linearity is an index showing the extent to which intervals between printed dots are equal, and is also referred to as the f-θ characteristic. However, a value of the linearity relatively changes depending on the image width. Therefore, a deviation in substantial imaging portions may be also considered. Since a plurality of sub-scanning optical systems are provided for one deflector the range was determined such that a deviation in the linearity or imaging portions of the sub-scanning optical systems substantially does not matter. A variation of the linearity may be ±0.1% or less and a deviation in the imaging portion may be ±0.5 dots or less.

Figure 4C:
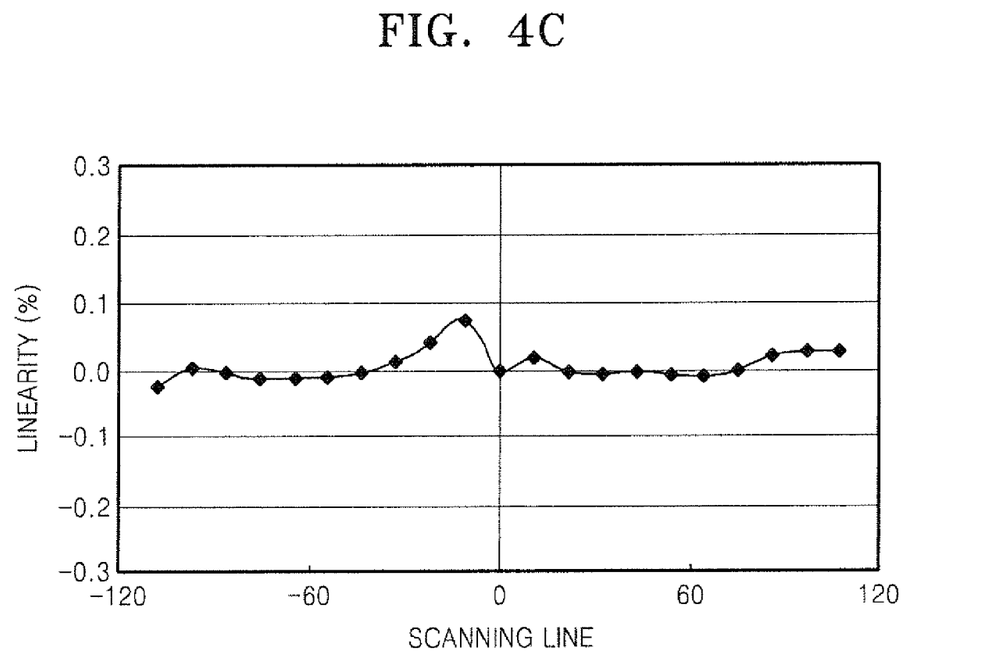
FIG. 4C is a graph illustrating a variation in the linearity of scanning lines along the first and second optical paths of a laser scanning unit according to aspects of the present invention.

FIGS. 4A, and 4B illustrate the linearity of scanning lines along the first and second optical paths op1 and op2, respectively, and FIG. 4C illustrates a variation of the linearity of the scanning lines along the first and second optical paths op1 and op2. Referring to FIG. 4C, a variation of the linearity along the first and second optical paths op1 and op2 is in the range of ±0.1%.

Figure 5A:
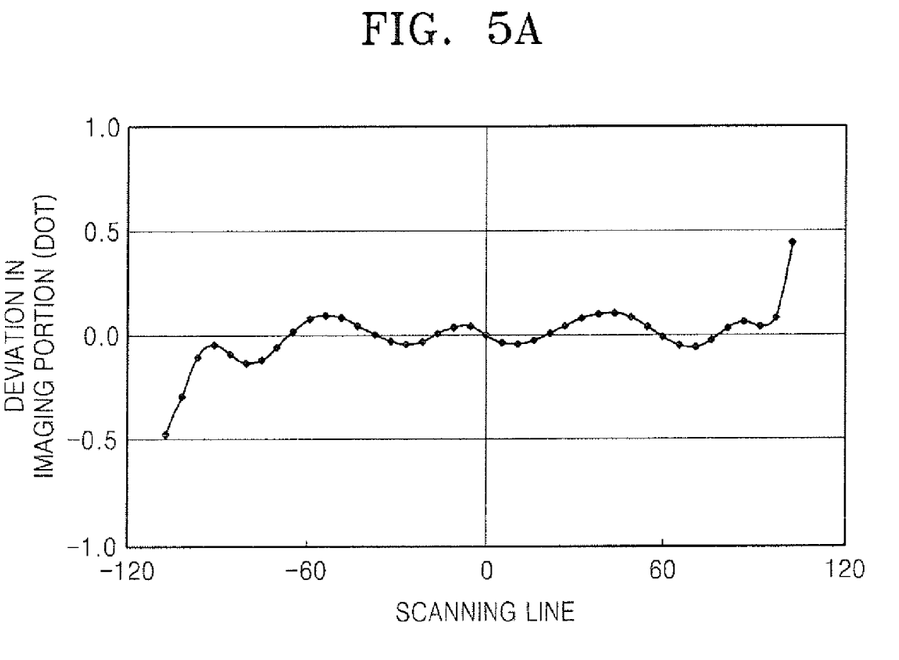
FIG. 5A is a graph illustrating deviation of an imaging portion of a scanning line along the first optical path of a laser scanning unit according to aspects of the present invention.
Figure 5B:
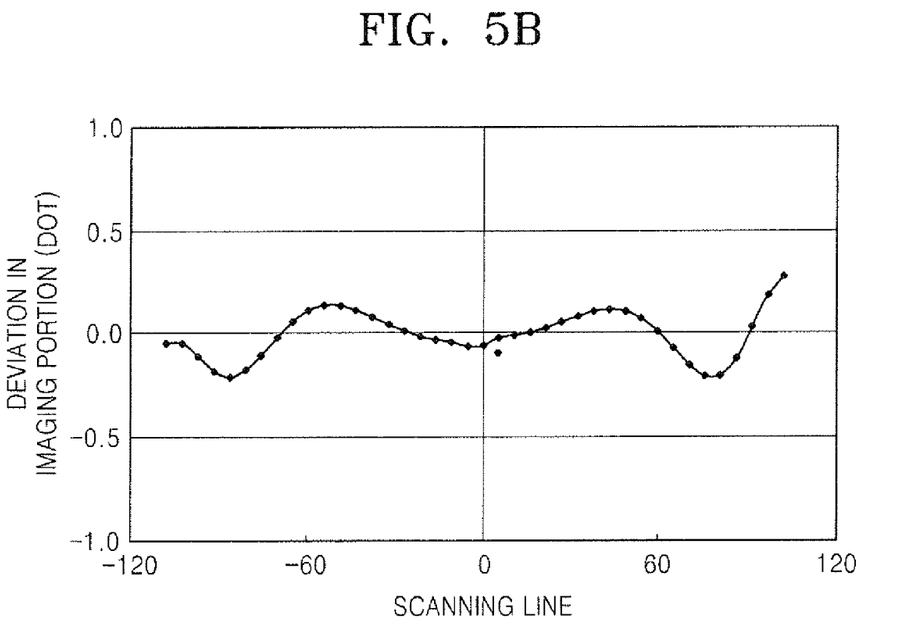
FIG. 5B is a graph illustrating deviation of an imaging portion of a scanning line along the second optical path of a laser scanning unit according to aspects of the present invention.
Figure 5C:
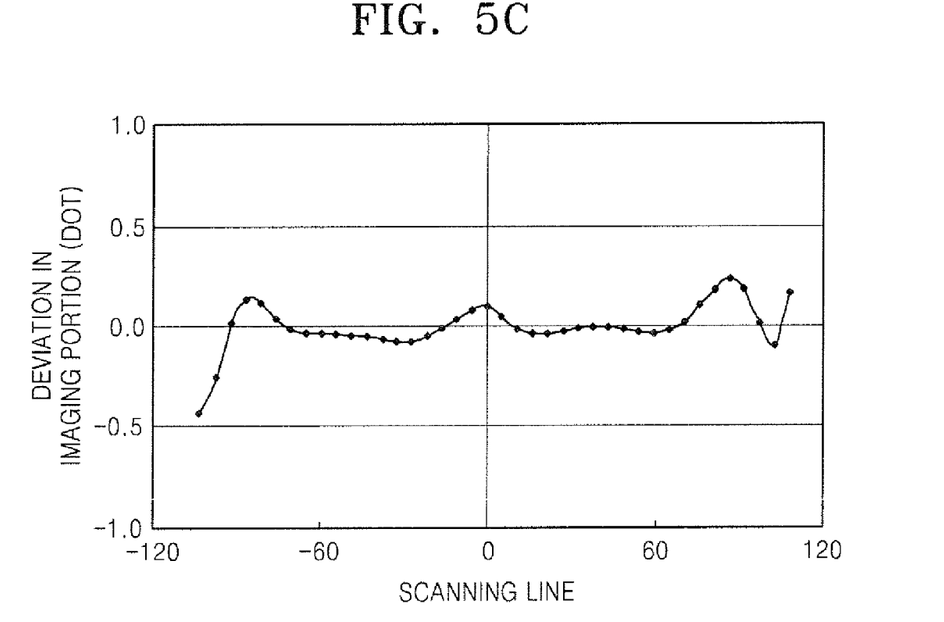
FIG. 5C is a graph illustrating a variation in the deviation of imaging portions of scanning lines along the first and second optical paths of a laser scanning unit according to aspects of the present invention.

FIGS. 5A and 5B illustrate deviations in imaging portions along the first and second optical paths op1 and op2, and FIG. 5C illustrates a variation of deviations in the imaging portions along the first and second optical paths op1 and op2. Referring to FIG. 5C, a variation in deviations in the imaging portions is in the range of ±0.5 dots. In the laser scanning unit 200 according to aspects of the present invention, the ratio (θ/θ') of an effective scanning angle of the first optical path op1 to the second optical path op2 may range from 0.7 to 1.3. The effective scanning angle determines a timing of a video signal modulation during scanning and is an important factor in the optical system structure.

As described above, aspects of the present invention can be effectively applied to an asymmetric laser scanning unit as the first through fourth sub-scanning optical systems 100a, 100b, 100c, and 100d including the asymmetric optical paths 19a, 19b, 19c, and 19d have a predetermined variation in the linearity and deviation in the imaging portions as shown in FIGS. 4A through 5C. For example, aspects of the present invention as described herein are useful for an asymmetric sub-scanning optical system that commonly uses a reflective surface of a deflector when a plurality of imaging surfaces are disposed on a curved surface of a transfer drum.

Figure 6:
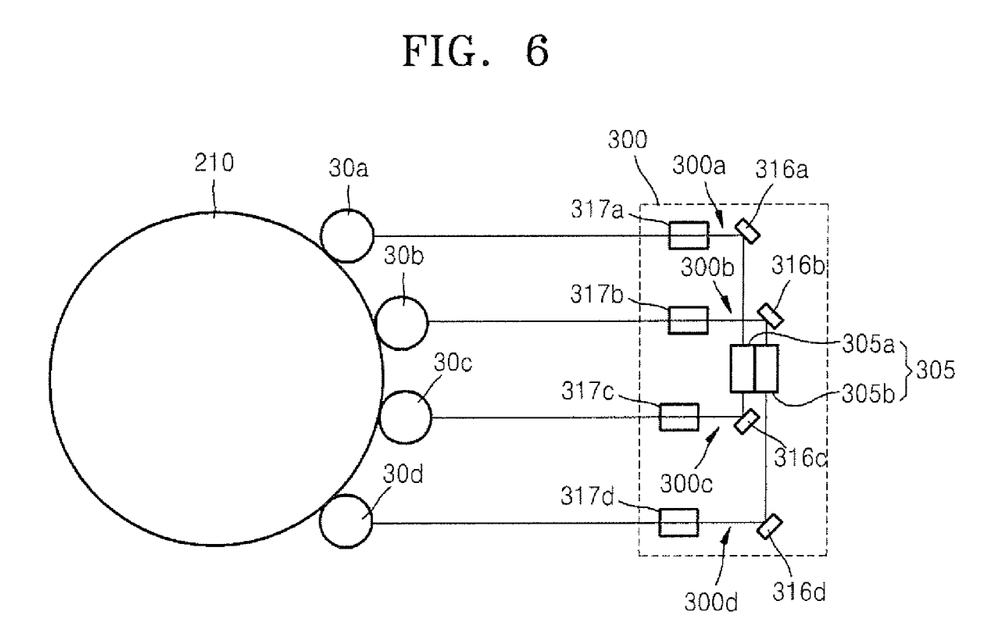
FIG. 6 is a view of a laser scanning unit in a sub-scanning direction according to aspects of the present invention.

FIG. 6 illustrates a laser scanning unit 300 according to aspects of the present invention. Referring to FIG. 6, a plurality of sub-scanning optical systems has asymmetric optical paths that commonly use a deflector unit 305. The laser scanning unit 300 includes the deflector unit 305 and the sub-scanning optical systems, for example, first through fourth sub-scanning optical systems 300a, 300b, 300c, and 300d. The sub-scanning optical systems 300a, 300b, 300c, and 300d scan respectively corresponding first through fourth imaging surfaces 30a, 30b, 30c, and 30d using light deflected by the deflector unit 305 that includes first and second deflectors 305a and 305b. And, the first and second deflectors 305a and 305b of the deflector unit 305 may have a same rotational axis. The first and third sub-scanning optical systems 300a and 300c use the first deflector 305a to produce electrostatic latent images on the first and third imaging surfaces 30a and 30c, and the second and fourth sub-scanning optical systems 300b and 300d use the second deflector 305b to produce electrostatic latent images on the second and fourth imaging surfaces 30b and 30d.

An optical path of light scanned by the first sub-scanning optical system 300a and an optical path of light scanned by the third sub-scanning optical system 300c are asymmetric and an optical path of light scanned by the second sub-scanning optical system 300b and an optical path of light scanned by the fourth sub-scanning optical system 300d are asymmetric because the lengths that the light has to travel from the first and second deflectors 305a and 305b to the first and third imaging surfaces 30a and 30c and to the second and fourth imaging surfaces 30b and 30d, respectively, are different. The asymmetric optical paths satisfy a predetermined variation in linearity and a deviation in imaging portions, as illustrated in FIG. 3.

The first through fourth sub-scanning optical systems 300a, 300b, 300c, and 300d each include a light source, an entrance optical unit, and an exit optical unit. Although the light source and the entrance optical unit are not illustrated in FIG. 6, the light source may be configured with the light sources 10a, 10b, 20a, and 20b, and the entrance optical unit may be configured with the collimating lenses 11a, 11b, 21a and 21b and the cylindrical lenses 12a, 12b, 22a, and 22b, as illustrated in FIG. 2. The exit optical units include first through fourth f-θ lenses 317a, 317b, 317c, and 317d, and may include one or more reflective mirrors 316a, 316b, 316c, and 316d for redirecting the optical paths. The first through fourth f-θ lenses may have different focal lengths depending on physical distances between the first through fourth f-θ lenses 317a, 317b, 317c, and 317d and the imaging surfaces 30a, 30b, 30c, and 30d. In addition, various sub-scanning optical systems may be provided which use the same reflective surface of a deflector and have asymmetric optical paths. And, any number of mirrors or reflective surfaces may be disposed therein depending upon the desired size of the ultimate image forming apparatus.

Figure 7:
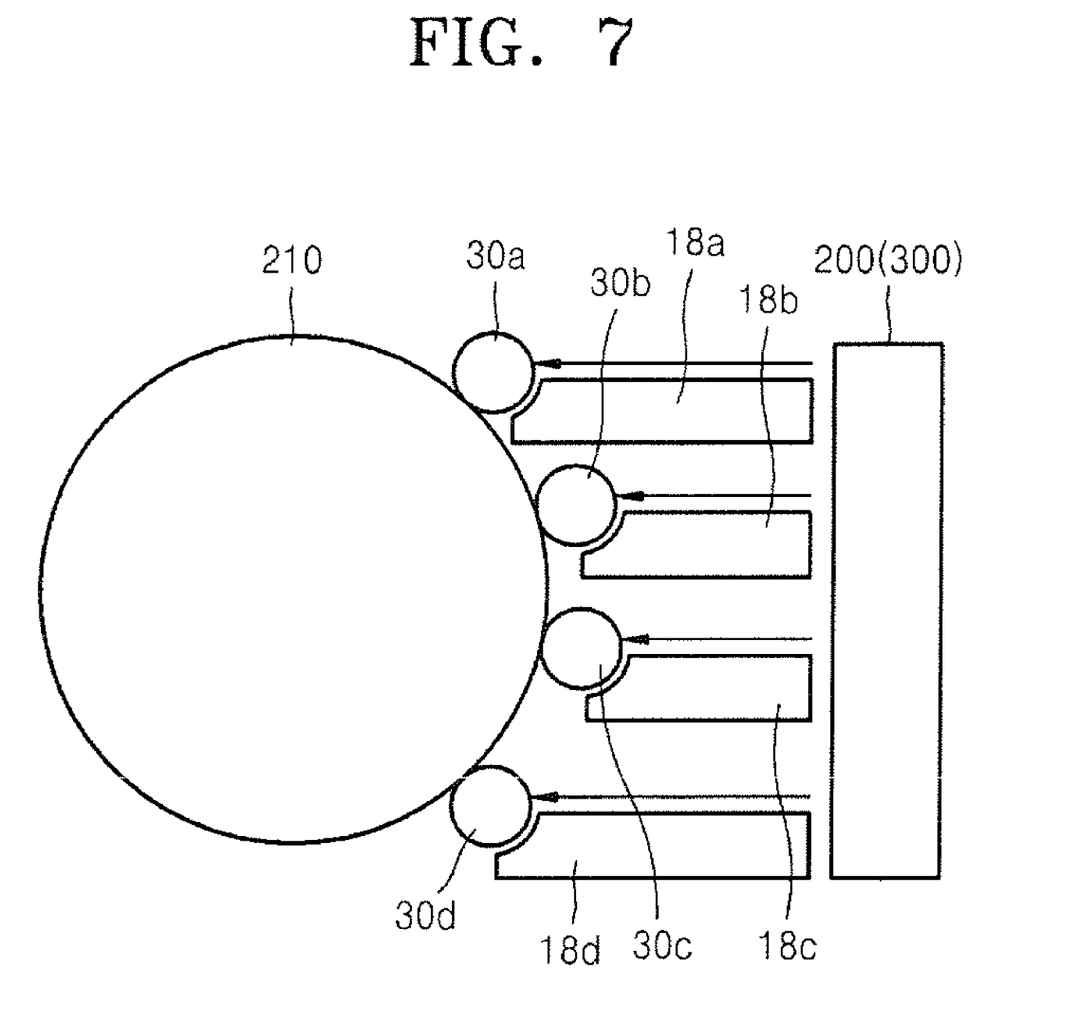
FIG. 7 is a schematic view of an image forming apparatus according to aspects of the present invention.

FIG. 7 schematically illustrates an image forming apparatus that includes the laser scanning units 200 and 300 to form a color image, according to aspects of the present invention. Referring to FIG. 7, the image forming apparatus includes the first through fourth imaging surfaces 30a, 30b, 30c, and 30d, the laser scanning units 200 and 300 to scan light on the first through fourth imaging surfaces 30a, 30b, 30c and 30d, a developing unit to develop an electrostatic latent image formed on the first through fourth imaging surfaces 30a, 30b, 30c, and 30d, and the transfer unit 210 on which the developed image is transferred. The light beams are emitted from the laser scanning units 200 and 300 in an on-off manner to the first through fourth imaging surfaces 30a, 30b, 30c, and 30d through the deflectors 15, 25, 305a, and 305b so as to form electrostatic latent images on the first through fourth imaging surfaces 30a, 30b, 30c, and 30d. Here, the light beam asymmetrically progresses to each of the imaging surfaces 30a, 30b, 30c, and 30d. The developing unit includes first through fourth developing members 18a, 18b, 18c, and 18d respectively corresponding to the first through fourth imaging surfaces 30a, 30b, 30c, and 30d. A developer is supplied from the first through fourth developing members 18a, 18b, 18c, and 18d, respectively, to the first through fourth imaging surfaces 30a, 30b, 30c, and 30d to form the electrostatic latent images according to each color to be applied to a print medium (not shown). The developed images are sequentially transferred to the transfer unit 210 to form a color image. That is, first through fourth lines, which are respectively transferred from the first through fourth imaging surfaces 30a, 30b, 30c, and 30d on the transfer unit 210, sequentially overlap to form the color image, and then the color image is fused on the print medium.

As described above, in a laser scanning unit according to aspects of the present invention, sub-scanning optical systems that use the same reflective surface of a deflector scan an imaging surface by irradiating light along asymmetric optical paths. In the laser scanning unit, imaging surfaces may be disposed on the same plane or on different planes for the sub-scanning optical systems. Therefore, as the laser scanning unit according to aspects of the present invention has no limitation in terms of a location of the imaging surfaces, the number of optical components such as a reflective mirror or the like disposed on an optical path can be reduced. Additionally, the size of the laser scanning unit can be decreased and the assembling of components simplified.

Furthermore, aspects of the present invention are advantageous when optical paths from sub-scanning optical systems have different lengths. For example, when an imaging surface is disposed on a curved surface of a transfer drum, the optical paths of the sub-scanning optical systems are asymmetric. In this case, in order to improve the print quality for these asymmetric optical paths, a laser scanning unit according to aspects of the present invention is configured to satisfy the characteristics in terms of the linearity or deviation in imaging portions. Additionally, the cost of fabricating the laser scanning unit according to aspects of the present invention can be reduced by including one f-θ lens in each of the sub-scanning optical systems.

In addition, an image forming apparatus according to aspects the present invention can be fabricated without a structural limitation in an imaging surface by employing the above-described laser scanning units to thereby improve the degree of assembly flexibility and productivity.

While aspects the present invention have been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A laser scanning unit, comprising:
a deflector to deflect incident light; and
a plurality of sub-scanning optical systems to form electrostatic latent images on corresponding imaging surfaces using a same reflection surface of the deflector,
wherein each of the sub-scanning optical systems comprises:
a light source,
an entrance optical unit disposed between the light source and the deflector to direct light to the deflector, and
an exit optical unit to direct the deflected light to the corresponding imaging surfaces,
wherein optical paths from the deflector to the corresponding imaging surfaces of the sub-scanning optical systems are asymmetric.

2. The laser scanning unit of claim 1, wherein the imaging surfaces are disposed on different planes depending on the sub-scanning optical systems.

3. The laser scanning unit of claim 1, wherein a length of the optical path of the exit optical unit or a length of the optical path from the deflector to the corresponding imaging surface is different from the lengths of the optical paths in at least one of the other sub-scanning optical systems.

4. The laser scanning unit of claim 1, wherein a variation of a linearity of scanning lines formed on the imaging surfaces by the sub-scanning optical systems is ±0.1% or less.

5. The laser scanning unit of claim 1, wherein a positional deviation of scanning lines formed on the imaging surfaces by the sub-scanning optical systems is ±0.5 dots or less.

6. The laser scanning unit of claim 1, wherein a ratio of effective scanning angles of the sub-scanning optical systems ranges from 0.7 to 1.3.

7. The laser scanning unit of claim 1, wherein the exit optical unit of each sub-scanning optical system comprises an f-θ lens.

8. The laser scanning unit of claim 1, wherein the exit optical unit comprises one or more reflective mirrors.

9. The laser scanning unit of claim 1, wherein the entrance optical unit comprises a collimating lens and a cylindrical lens.

10. A laser scanning unit, comprising:
a first deflector to deflect incident light;
first and second sub-scanning optical systems to form electrostatic latent images on corresponding imaging surfaces using a same reflection surface of the first deflector;
a second deflector to deflect incident light; and
third and fourth sub-scanning optical systems to form electrostatic latent images on corresponding imaging surfaces using a same reflection surface of the second deflector,
wherein the first through fourth sub-scanning optical systems each comprise:
a light source,
an entrance optical unit disposed between the light source and the deflector to direct light to the deflector, and
an exit optical unit to direct the deflected light to the corresponding imaging surfaces,
wherein optical paths of the first and second sub-scanning optical systems from the first deflector to the corresponding imaging surfaces are asymmetric with reference to the first deflector, and optical paths of the third and fourth sub-scanning optical systems from the second deflector to the corresponding imaging surfaces are asymmetric with reference to the second deflector.

11. The laser scanning unit of claim 10, wherein the imaging surfaces are disposed on different planes depending on the first through fourth sub-scanning optical systems.

12. The laser scanning unit of claim 10, wherein a length of the optical path of the exit optical unit or a length of the optical path from the deflector to a corresponding imaging surface of at least one of the first through fourth sub-scanning optical systems is different from the lengths of the optical paths in at least one of the other first through fourth sub-scanning optical systems.

13. The laser scanning unit of claim 10, wherein a variation of a linearity of scanning lines formed on the imaging surfaces by the first through fourth sub-scanning optical systems is ±0.1% or less.

14. The laser scanning unit of claim 10, wherein a positional deviation of scanning lines formed on the imaging surfaces by the first through fourth sub-scanning optical systems is ±0.5 dots or less.

15. The laser scanning unit of claim 10, wherein a ratio of effective scanning angles of the first through fourth sub-scanning optical systems ranges from 0.7 to 1.3.

16. The laser scanning unit of claim 10, wherein the exit optical unit comprises an f-θ lens.

17. The laser scanning unit of claim 10, wherein the exit optical unit comprises one or more reflective mirrors.

18. The laser scanning unit of claim 10, wherein the entrance optical unit comprises a collimating lens and a cylindrical lens.

19. The laser scanning unit of claim 10, wherein the first deflector and the second deflector are disposed on a same rotational axis.

20. An image forming apparatus, comprising:
the laser scanning unit of claim 1;
imaging surfaces on which electrostatic latent images are formed;
a developing unit to develop the electrostatic latent images; and
a transfer unit to which the developed images are transferred.

21. The image forming apparatus of claim 20, wherein the imaging surfaces are disposed on different planes.

22. The image forming apparatus of claim 20, wherein a length of the optical path of at least one of the sub-scanning optical systems from the exit optical unit or a length of the optical path from the deflector to a corresponding imaging surface is different from lengths of the optical paths in the other sub-scanning optical systems.

23. The image forming apparatus of claim 20, wherein the transfer unit comprises a transfer drum.

24. An image forming apparatus, comprising:
the laser scanning unit of claim 10;
imaging surfaces on which electrostatic latent images are formed;
a developing unit to develop the electrostatic latent images; and
a transfer unit to which the developed images are transferred.

* * * * *